United States Patent [19]
Larson et al.

[11] Patent Number: 6,003,387
[45] Date of Patent: Dec. 21, 1999

[54] FLOW SENSOR FOR USE ON CROP HARVESTING HAVING TWO ARMS AND A MIDDLE INTEGRATED PORTION EXTENDING IN THE FLOW PATH

[75] Inventors: Tad D. Larson, Anamosa, Iowa; Kent D. Barnard, Wayne City, Ill.

[73] Assignee: Rockwell International Corporation, Milwaukee, Wis.

[21] Appl. No.: 08/936,503

[22] Filed: Sep. 24, 1997

[51] Int. Cl.⁶ .................................................. G01F 1/30
[52] U.S. Cl. .................................. 73/861.73; 73/841.74; 460/1; 56/DIG. 2
[58] Field of Search ........................... 73/861.73, 861.74, 73/861.75, 861.71, 861.72; 460/1, 4, 150; 56/DIG. 2

[56] References Cited

U.S. PATENT DOCUMENTS

| | | | |
|---|---|---|---|
| 4,157,661 | 6/1979 | Schindel | 73/861.73 |
| 5,159,840 | 11/1992 | Leifeld | 73/861.73 |
| 5,282,389 | 2/1994 | Faivre et al. | 73/861.73 |
| 5,343,761 | 9/1994 | Myers | 73/861.73 |
| 5,369,603 | 11/1994 | Myers | 364/571.02 |
| 5,561,250 | 10/1996 | Myers | 73/861.71 |
| 5,592,606 | 1/1997 | Myers | 395/356 |

*Primary Examiner*—Harshad Patel
*Attorney, Agent, or Firm*—Kyle Eppele; James P. O'Shaughnessy

[57] ABSTRACT

An improved flow sensor is disclosed for use with a crop harvesting device to determine flow volume of a crop yield product. The improved flow sensor is of the type which uses a strain gauge and includes an improved probe coupled to the strain gauge and adapted to cooperate with the strain gauge to produce a signal indicative of pressure being applied to the probe by the crop yield product. The improved probe includes first and second connection members adapted to couple the probe to the strain gauge. A probe middle portion is coupled to each of the first and second connection members and extends from a location between the first and second connection members into a middle portion of the flow path of the crop yield product. First and second probe legs are coupled to and extend from first and second sides of the probe middle portion into first and second sides of the flow of crop yield product.

15 Claims, 4 Drawing Sheets

000
FLOW SENSOR FOR USE ON CROP HARVESTING HAVING TWO ARMS AND A MIDDLE INTEGRATED PORTION EXTENDING IN THE FLOW PATH

INCORPORATION BY REFERENCE

The present application incorporates by reference U.S. Pat. No. 5,282,389 entitled APPARATUS FOR MEASURING AGRICULTURAL YIELD which issued to Faivre et al. on Feb. 1, 1994.

FIELD OF THE INVENTION

The present invention relates to agricultural equipment, such as a combine, for harvesting and threshing a crop. More particularly, the present invention relates to an improved sensor probe for use on a yield measuring apparatus, such as the device disclosed in U.S. Pat. No. 5,282,389, which can be included on agricultural equipment to accurately map the yield of a field.

BACKGROUND OF THE INVENTION

Fields in which crops are planted rarely have a homogeneous soil composition. Different soil types have a different ability to retain water, nutrients, pesticides, herbicides, etc. Consequently, if uniform application of fertilizers, pesticides, herbicides, and water is carried out, there will be a varied crop yield throughout a given field. This problem induced the development of customized soil and crop treatment, which has been a very high priority research area in the agricultural industry over the last decade.

Early attempts at customizing soil and crop treatment involved manual plotting of the field, monitoring of soil type and condition, and yield monitoring. Of late, field mapping has become substantially more sophisticated. Computer assisted mapping techniques, together with satellite tracking, are commonly used. Crop yield can now be very precisely mapped.

A critical aspect of field mapping is the accurate monitoring of the crop yield. Heretofore, a wide range of different techniques and systems have been developed to monitor crop yields. One such system is described in detail in U.S. Pat. No. 5,282,389 to Faivre et al. entitled APPARATUS FOR MEASURING AGRICULTURAL YIELD. The system described in the '389 patent includes a structure for measuring flow pressure of conveying clean yield product and for converting this pressure data to a meaningful flow rate signal to generate a field yield map. The disclosed structure includes an actuating arm or probe, mounted such that it intercepts clean yield product discharging from a grain elevator on the combine, and adapted to produce a signal indicative of a pressure being applied to the actuating arm by the clean yield product. This pressure value can be correlated with other data, i.e. combine width, elevator speed, ground speed of the crop processing apparatus, etc., to generate a flow rate value that can be continuously plotted to generate a yield map for a field.

The signal producing structure disclosed in the '389 patent includes a strain gauge coupled to the actuating arm or probe to detect the pressure applied on the actuating arm or probe by the conveying clean yield product. Systems such as the one disclosed in the '389 patent have been found to have certain features which disadvantageously effect the flow sensor's operation. For example, the available flow sensor probe or actuating arm impact surfaces demonstrate inadequate flow sensing during inclined operation and during periods of operation with low flow. Thus, while harvesting a crop on an inclined surface or at slow speeds, or during low flow harvesting, the flow sensor accuracy is adversely effected. Further, occasional bending of the actuating arm or probe has occurred during use, also adversely effecting operation of the flow sensor.

SUMMARY OF THE INVENTION

An improved flow sensor is disclosed for use with a crop harvesting device to determine flow volume of a crop yield product. The improved flow sensor is of the type which uses a strain gauge, and includes an improved probe coupled to the strain gauge and adapted to cooperate with the strain gauge to produce a signal indicative of pressure being applied to the probe by the crop yield product. The improved probe includes first and second connection members adapted to couple the probe to the strain gauge. A probe middle portion is coupled to each of the first and second connection members and extends from a location between the first and second connection members into a middle portion of the flow path of the crop yield product. First and second probe legs are coupled to and extend from first and second sides of the probe middle portion into first and second sides of the flow of crop yield product.

DETAILED DESCRIPTION OF THE PREFERRED EMBODIMENTS

Figure 1:
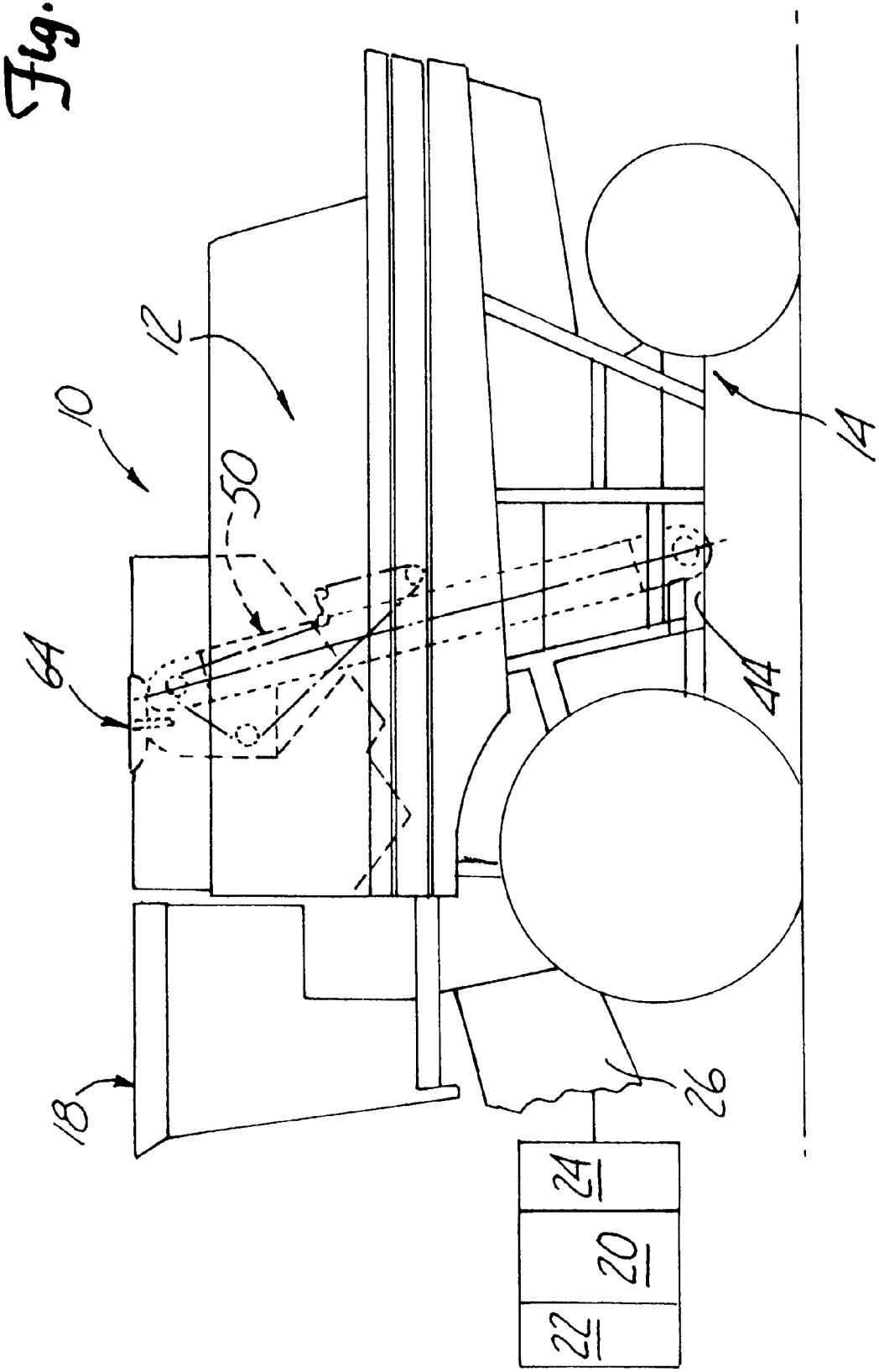
FIG. 1 is a side elevation view of a conventional combine having a yield flow sensor incorporating an improved probe in accordance with the present invention.

In FIG. 1, a conventional combine is shown as an example of one type of agricultural crop processing apparatus suitable for incorporation of the present invention. A brief discussion of the operation of the combine 10 is provided to identify the environment for the invention. A more thorough discussion of combine 10, as well as a flow sensor mechanism 64 with which the present invention can be used, is provided in U.S. Pat. No. 5,282,389 entitled APPARATUS FOR MEASURING AGRICULTURAL YIELD and herein incorporated by reference.

Combine 10 has a harvesting and threshing mechanism 12 that is supported on a wheeled carriage 14. An enclosed operator compartment 18 is provided at the front of combine 10, and in compartment 18 mechanisms are provided to control all functions of combine 10. The combine 10 performs the multiple functions of cutting, threshing and cleaning a crop as it traverses a field.

At the front of the combine 10, a cutter assembly 20, shown schematically, is provided. A revolving reel 22, shown schematically, pushes the grain stalks towards a cutting bar (not shown) on the cutter assembly 20, which severs the stalks. A rotary feed auger 24, shown schematically, conveys the cut stalks laterally inwardly for delivery to an endless conveyor system 26 which directs the grain stalks to a threshing cylinder (not shown). The threshing cylinder causes the grain, chaff, and short fragments of straw to be broken loose and delivered through various well known mechanisms to the rear of the combine 10.

The clean grain accumulates in a bin 44 and is conveyed therethrough by augers (not shown) or other mechanisms to a clean grain elevator 50 which raises the clean grain and delivers the same to a point of use, which may be a storage bin or directly into bags.

The present invention is directed to an actuating arm or probe for use in a structure 64 for measuring the pressure of conveying clean yield product/grain. Structure 64 incorporates the probe of the present invention to more accurately produce a signal that can be processed with other data to produce a flow rate number for the clean yield product. The flow rate number can be in turn utilized to generate a yield map for a field. While operation of structure 64 incorporating the improved probe of the present invention is described below in detail, additional explanation of flow sensors of this type can be found in U.S. Pat. No. 5,282,389. The '389 patent also provides a detailed discussion of prior art probe or actuating arm designs which the probe of the present invention is adapted to replace. Since the inventive probe adapted for inclusion in structure 64 is associated with the clean yield elevator 50, the details of elevator 50 are described below.

Figure 2:
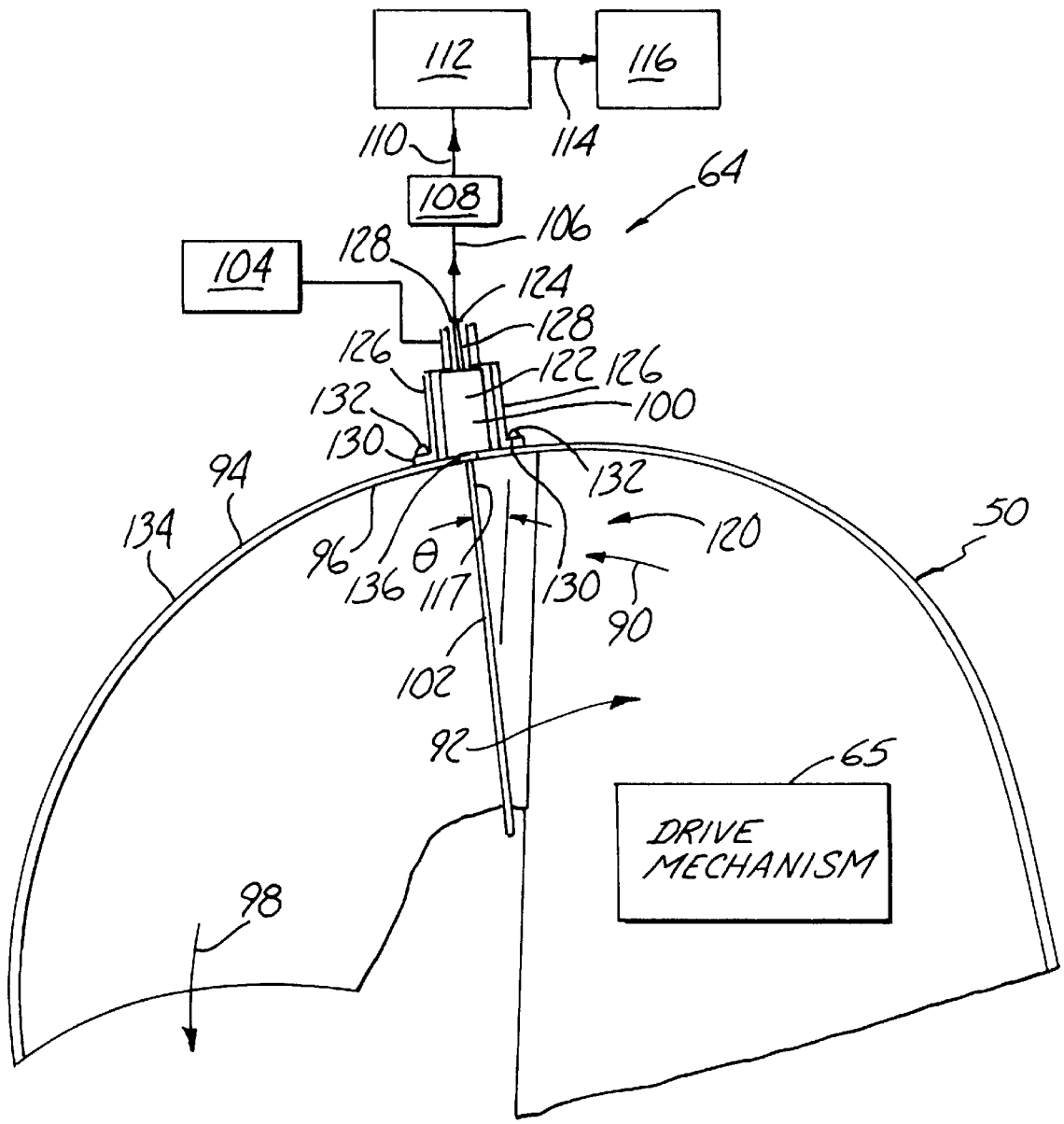
FIG. 2 is an enlarged, fragmentary, elevation view of the upper portion of the clean yield product elevator of the combine illustrated in FIG. 1, and having the improved agriculture yield flow sensor probe included thereon.

As shown in FIG. 2, a drive mechanism, shown schematically at 65, picks up clean yield product from auger 44 and advances the same toward discharge end 92 of elevator 50. The clean yield is propelled by centrifugal forces forwardly and upwardly in the direction of arrow 90 at the discharge end 92 of the elevator 50. The top of the elevator 50 is bounded by a shroud 94 having an inverted, U-shape deflecting surface 96 that intercepts discharging grain and diverts the same downwardly in the direction of arrow 98.

Structure 64 is mounted to the shroud 94. More particularly, structure 64 in which the inventive probe is incorporated has a load cell 100 which acts as a differential bending beam. The structure 64 produces an output signal that is representative of a stress difference between two points on the inventive actuating arm or probe 102 projecting downwardly into the flow of clean yield discharging from the elevator 50, which stress difference is induced by pressure from the conveying clean yield product.

The load cell 100 is excited by 10 to 25 volts from a power source 104. The load cell 100 generates a signal with a frequency that is proportional to the load applied to the actuating arm 102 by the conveying yield from the elevator 50. An analog signal 106 is generated by the load cell 100 and is received by an amplifier board 108 which converts the analog signal to a pulsed voltage signal 110. The load cell 100 and amplifier board 108 can be incorporated into a single unit to avoid any antenna effect. The pulsed voltage signal 110 can be delivered to an off-the-shelf, commercially available flow meter 112 to be converted thereby to a meaningful flow rate value or signal 114. Suitable flow meters are commonly used to deliver metered amounts of liquid fertilizer to a field. This flow rate signal 114 can in turn be processed by a computer 116 to plot the yield flow rate for a complete field. The computer 116 can also be programmed to process signals from a global navigational satellite system (GNSS) to precisely monitor the navigation of the combine 10 and to aid in generating a yield map.

A PVC "can" 122 houses certain electronic components for the load cell 100. Within the "can" 122, the load bar 117 (of which probe 102 can be considered a part) is slightly necked down to give a greater output signal. Within the "can" 122, there can be a four arm Wheatstone bridge wired to measure differential strain. A resistor can be provided to compensate for changes in span output due to modulus of elasticity changes. A 38 gauge magnetic wire can be used to compensate for zero shift due to temperature.

The portion 124 of the load bar 117 that projects upwardly from the actuating arm 102 and through the "can" 122 provides a means for mounting the actuating arm 102 in its operative position. Two cooperating and identical brackets 126 bound the can "122" and have integral legs 128 between which the load bar portion 124 is captively bolted. The brackets 126 have offset flanges 130 which are secured by bolts 132 to the upper surface 134 of the shroud 94. The load bar 117 projects through an opening 136 in the shroud 94. The opening 136 is larger than the cross-section of the load bar 117 so that the actuating arm 102 does not contact the shroud 94 in use.

The preferred orientation for the actuating arm 102 is shown in FIG. 2. The actuating arm 102 projects downwardly in cantilever fashion from the shroud 94 and is angled slightly towards the discharge end 92 of the elevator 50. An angle $\Theta$ of approximately 10° is defined between a vertical line and the line of the length of the actuating arm 102.

Figure 3:
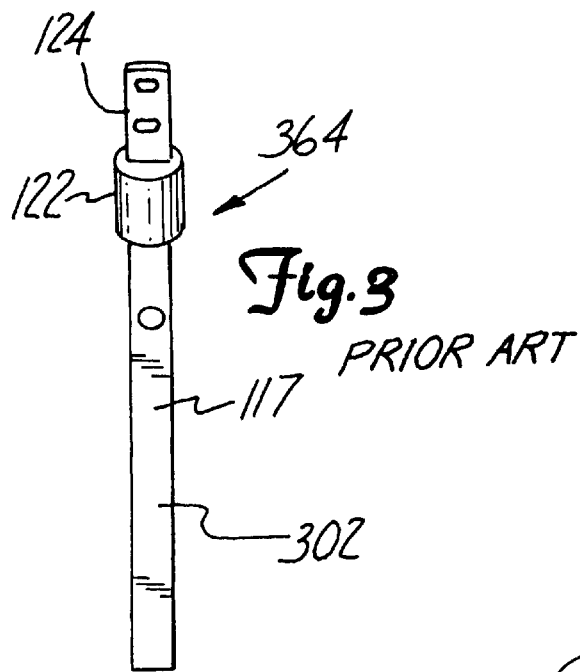
FIG. 3 is a perspective view of an isolated portion of a prior art agriculture flow sensor illustrating a first prior art probe design.

FIG. 3 illustrates a first prior art structure 364 having a probe or actuating arm 302. Prior art structure 364 is equivalent to structure 64 shown in FIGS. 1 and 2, but with prior art actuating arm or probe 302 instead of the inventive probe 102. The actuating arm 302 projects into the space 120 bounded by the shroud 94 and has a substantially uniform, rectangular cross-section taken transversely to its length. The longer cross-sectional dimension is less than 1 inch and is described in the '389 patent as being preferably 0.75 inches. The shorter cross-sectional dimension is less than ⅓ of an inch and more preferably ¼ of an inch. The total width of the clean yield flow pattern, which the actuating arm 302 intercepts, is on the order of 7 to 9 inches. Consequently, the longer dimension of the actuating arm 302, which intercepts the flow, does not significantly disturb the flow pattern of the discharging clean yield product at the discharge end 92 of the elevator 50. It has been found that probe 302 of structure 364 does not adequately intercept the flow of clean yield product in low flow situations or when harvesting on a hillside. Also, probe 302 is susceptible to bending.

Figure 4:
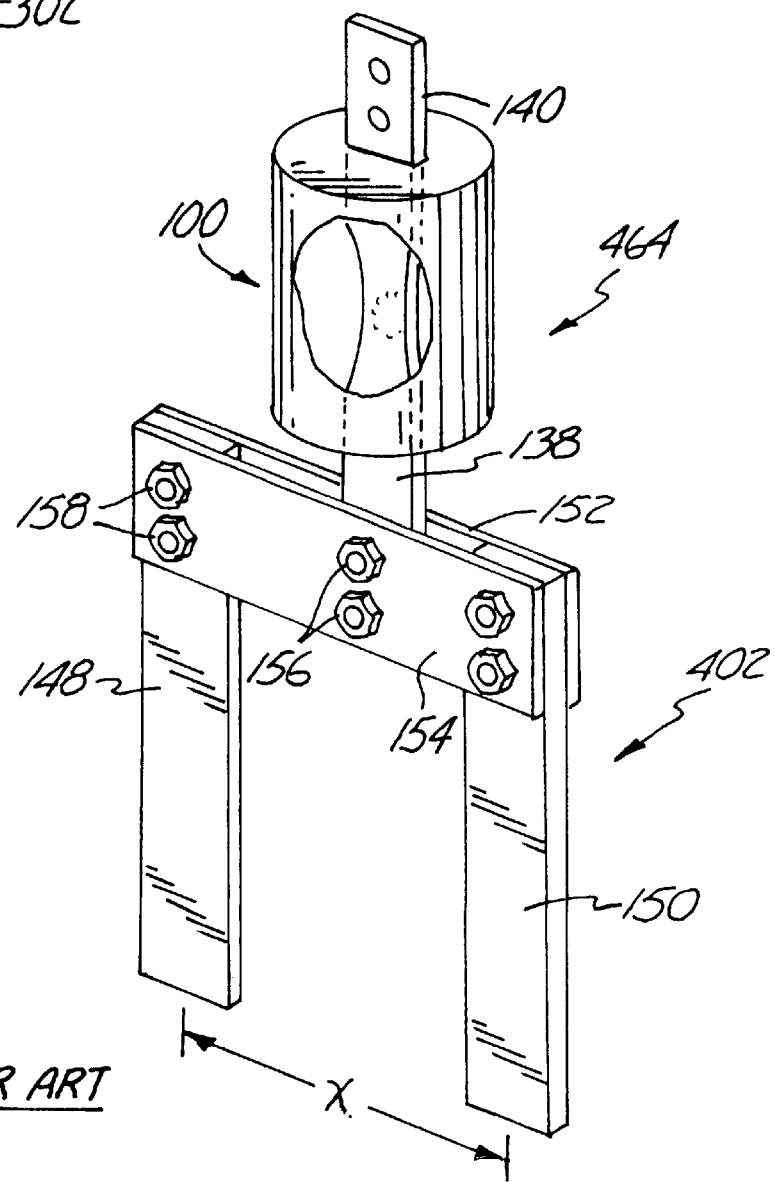
FIG. 4 is a perspective view of an isolated portion of a second prior art agriculture flow sensor illustrating a second prior art probe design.

A second prior art configuration of a structure for measuring the pressure of conveying flowable material is shown at 464 in FIG. 4. Structure 464 is similar to structures 64 and 364, but incorporates a second prior art probe 402. The pressure measuring structure 464 has the load cell 100 thereon with the exposed mounting portion 140 and support base 138. Probe 402 has two actuating arms 148, 150 substituted for the single arm 302, described above. The arms 148, 150 are connected to the support base 138 by first and second cross pieces 152, 154. The cross pieces 152, 154 are placed on opposite sides of the support base 138 and connected thereto as by bolts 156. The support base 138 connects to the cross pieces 152, 154 approximately midway between the ends of the cross pieces 152, 154.

The actuating arm 148 is captively held between the cross pieces 152, 154 at one end thereof and secured by bolts 158. A similar connection is made between the other end of the cross pieces 152, 154 and the actuating arm 150. The actuating arms 148, 150 project in cantilever fashion from the cross pieces 152, 154 and extend substantially parallel to each other. Cross pieces 152, 154 are positioned such that they do not intercept clean yield product in the elevator flow path.

In this prior art structure, inclusion of two separate actuating arms 148 and 150 in the design of probe 402 is described in the '389 patent as improving the performance of the structure in low flow harvesting situations, and situations in which the combine is harvesting on a hillside. One of the stated objectives of prior art probe design 402 of structure 464 is that the two actuating arm arrangement increases the likelihood that the flow of material is at all times intercepted, regardless of the orientation of the device on which structure 464 is mounted. If the combine tips to one side, the crop flow is intended to be intercepted to be actuating arm 148. It is also intended in the prior art that opposite tipping results in the flow being intercepted principally by actuating arm 150. However, it has been found that probe 402 still does not adequately intercept the flow of clean yield product in low flow situations or when harvesting on a hillside. In fact, it is clear from the '389 patent that prior art probes, such as probes 302 and 402 illustrated in FIGS. 3 and 4 of the present application, preferably intercept as small a portion of the cleaned yield product or grain as possible. This is contrary to the probe design of the present invention in which it is desired to intercept as much of the flow of clean yield product as possible without impeding the flow and thereby clogging the elevator.

Figure 5:
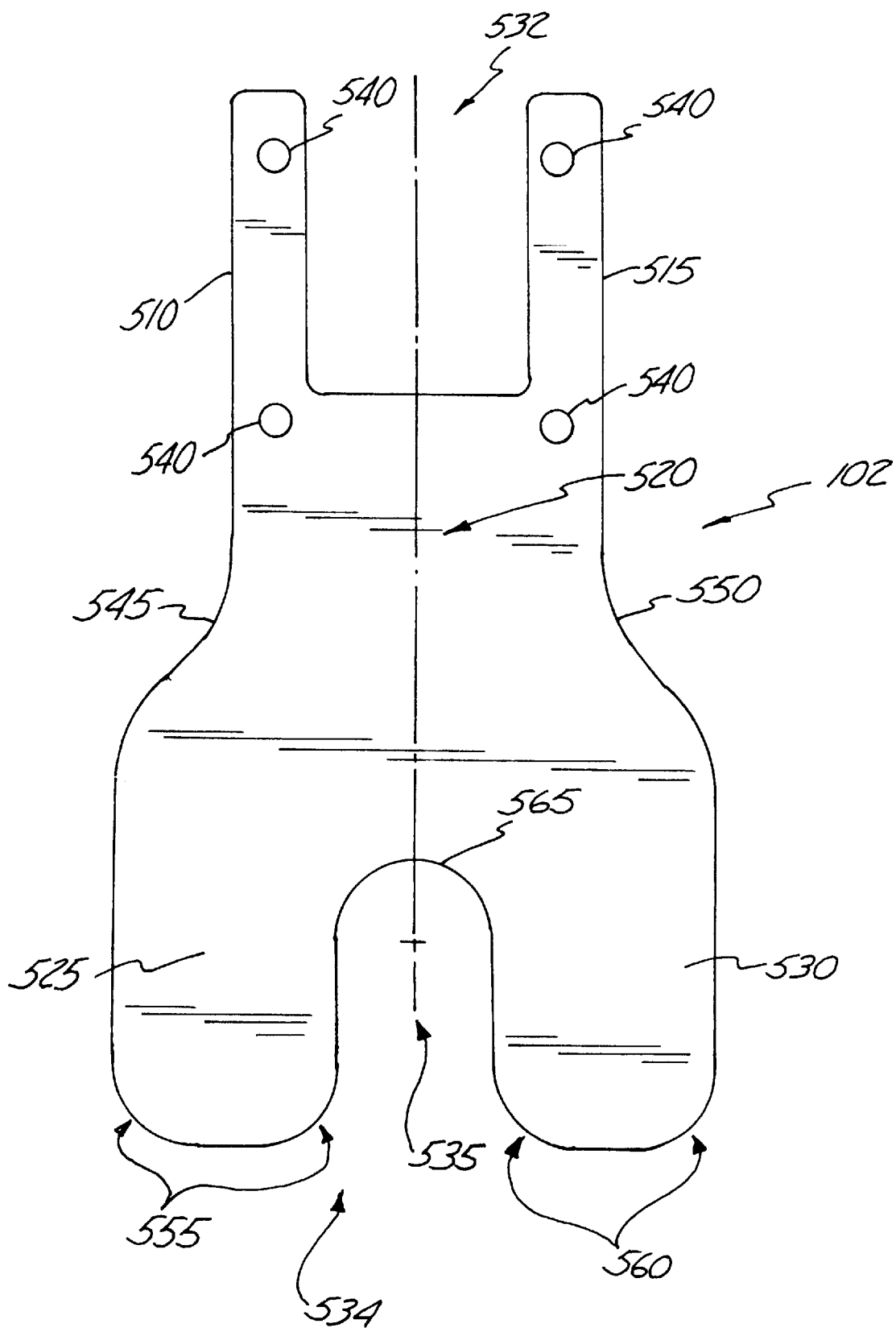
FIG. 5 is a front view of an agriculture flow sensor probe, in accordance with the present invention, which can be used with the agriculture flow sensor illustrated in FIGS. 1 and 2.

FIG. 5 is a front view of an improved agriculture flow sensor probe 102 for use in flow sensor structure 64 illustrated in FIGS. 1 and 2. Probe 102 includes first and second connection members or arms 510 and 515, middle portion 520, and first and second legs 525 and 530. Connection members 510 and 515 include holes 540 adapted to receive bolts 158 in order to connect probe 102 to members 152 and 154 (bolts 158 and members 152 and 154 shown in FIG. 4), and thereby to the remainder of flow sensor structure 64. In other words, probe 102 is particularly adapted to be a drop-in replacement for probe 402 illustrated in FIG. 4. Proximal end 532 of probe 102, having connection members 510 and 515 and holes 540, couples to the strain gauge and other components of flow sensor 64 in the same manner that actuating arms 148 and 150 coupled to the components of flow sensor structure 464. Thus, probe 102 attaches to cross pieces 152 and 154 by alignment of holes 540 with the corresponding holes in pieces 152 and 154 and by insertion of bolts therethrough. Distal end 534 of probe 102 extends down into the flow path of the clean yield product and intercepts a portion thereof.

Probe 102 is adapted to maximize the amount of sensing surface, or force application area, in order to maximize the portion of the clean yield product intercepted by the probe. Simultaneously, probe 102 is adapted to minimize the chances of probe 102 obstructing the flow of clean yield product to the point of plugging the elevator. To this end, probe 102 includes the middle portion 520 extending downward from connection members 510 and 515 into the flow of clean yield product. This middle portion of probe 102 intercepts clean yield product from the center of the flow. Also, leg members 525 and 530 extend downward from middle portion 520 on first and second sides of probe 102 in order to further maximize the impact surface. Further features of probe 102 which maximize the impact surface include widening the width, taken transversely to the direction of the flow of clean yield product, of leg members 525 and 530 as compared to the prior art. Also, the total width of probe 102 at distal end 534 is greater than a total width of probe 102 at middle portion 520. This allows probe 102 to be used as a replacement in conventional structure 464, while simultaneously maximizing the force application area of the probe. In preferred embodiments, each of legs 525 and 530 has a width of at least 1.4 inches. A total width of probe 102 at distal end 534 is at least about 3.5 inches. Probe middle portion 520 preferably has a width of at least about 2 inches, but this width will typically be the same as the prior art probe which probe 102 replaces. Also, distal end 534 extends downwardly into the flow of clean yield product by at least about 4.4 inches relative to the distal most pair of holes 540.

Since probe 102 is designed to maximize the impact surface, certain features have been found to aid in minimizing the chances of probe 102 plugging the elevator during operation in high flow situations. For example, notch 535 is included between leg members 525 and 530 to allow clean yield product to flow between the leg members. In preferred embodiments, a width of notch 535 is at least about one inch. Notch 535 preferably extends from distal end 534 toward proximal end 532 by at least about 1.5 inches to allow sufficient flow therethrough. Also, in order to minimize the blockage, and grain damage of the clean yield product flow, surfaces 545, 550, 555, 560 and 565 are curved or rounded. This is in contrast to the squared edges of the conventional probe designs discussed above.

In some preferred embodiments of the present invention, probe 102 is formed of a material such as 304 stainless steel. However, in other embodiments, probe 102 is formed of a composite material such as fiber glass or graphite fiber in order to lessen the mass of the probe. Further, in preferred embodiments, a polyethylene or a polyurethane coating covers the grain contact surfaces of probe 102 in order to reduce build-up from crop residues in the flow of clean yield product. In embodiments in which probe 102 is formed of a material such as 304 stainless steel, it is preferred that first and second connection members 510 and 515, middle portion 520, and leg members 525 and 530 be formed from a continuous piece of stamped metal in order to strengthen sensor probe 102. This aids in minimizing damage to probe 102, and facilitates repair.

Although the present invention has been described with reference to preferred embodiments, workers skilled in the art will recognize that changes may be made in form and detail without departing from the spirit and scope of the invention.

What is claimed is:

1. A flow sensor for use with a crop harvesting device to determine flow volume of a crop yield product, wherein the crop harvesting device includes a flow path along which the crop yield product flows with the aid of an elevator, the flow sensor comprising:

a strain gauge; and a probe coupled to the strain gauge and adapted to cooperate with the strain gauge to produce a signal indicative of pressure being applied to the probe, the probe comprising:

a first connection member adapted to couple the probe to the strain gauge;

a second connection member adapted to couple the probe to the strain gauge;

a probe middle portion coupled to each of the first and second connection members and extending from a location between the first and second connection members into the flow path such that the probe middle portion intercepts crop yield product flowing along the flow path, the probe middle portion extending into the flow path by a first distance relative to a proximal end of the probe;

a first leg coupled to and extending from a first side of the probe middle portion, the first leg extending into the flow path by a second distance relative to a proximal end of the probe, greater than the first distance, such that the first leg intercepts crop yield product flowing along the flow path, the first leg having rounded corners at a distal end thereof thereby minimizing an amount that the probe impedes the flow of crop yield product; and a second leg coupled to and extending from a second side of the probe middle portion, the second leg extending into the flow path by the second distance such that the second leg intercepts crop yield product flowing along the flow path, the second leg having rounded corners at a distal end thereof, thereby minimizing an amount that the probe impedes the flow of crop yield product.

2. The flow sensor of claim 1, wherein at the probe middle portion the probe has a first width, taken traversely to the direction of the flow of crop yield product which the probe intercepts, that is at least about two inches.

3. The flow sensor of claim 2, wherein at the distal end of the probe the probe has a second width, taken from an outer edge of the first leg to an outer edge of the second leg and taken traversely to the direction of the flow of crop yield product which the probe intercepts, that is at least about 3.5 inches.

4. The flow sensor of claim 3, wherein the probe further comprises a notch positioned between the first and second legs of the probe and adapted to allow crop yield product to flow between the first and second legs.

5. The flow sensor of claim 4, wherein the notch of the probe extends from the distal end of the probe toward the proximal end of the probe by a third distance, wherein the third distance is at least about 1.5 inches.

6. The flow sensor of claim 5, wherein the notch has a third width, taken traversely to the direction of the flow of crop yield product which the probe intercepts, of at least about 1 inch.

7. In an apparatus for processing an agricultural crop, the apparatus having an elevator and a flow path along which crop yield product flows with the help of the elevator, an improved flow sensor probe adapted to cooperate with a strain gauge to produce a signal indicative of pressure being applied to the probe by the crop yield product and thereby indicative of a flow volume of the crop yield product, the improved probe comprising:

first connection means for coupling the probe to the strain gauge;

second connection means for coupling the probe to the strain gauge;

first crop yield product interception means for intercepting crop yield product at a proximal end of the probe and along a middle portion of the flow path, taken traversely to the direction of flow of the crop yield product, wherein the first crop yield product interception means is coupled to each of the first and second connection means and extends from a location between the first and second connection means into the middle portion of the flow path;

second crop yield product interception means for intercepting crop yield product along a first side of the flow path at a distal end of the probe, the first side of the flow path being adjacent the middle portion of the flow path;

third crop yield product interception means for intercepting crop yield product along a second side of the flow path at the distal end of the probe, the second side of the flow path being adjacent the middle portion of the flow path opposite the first side of the flow path.

8. The improved probe of claim 7, wherein the second and third crop yield product interception means are coupled to and extend from the first crop yield product interception means, wherein the first crop yield product interception means extends into the flow path by a first distance relative to the proximal end of the probe, wherein the second and third crop yield product interception means extend into the flow path by a second distance relative to the proximal end of the probe which is greater than the first distance.

9. The improved probe of claim 8, wherein the first and second connecting means and the first, second and third crop yield product interception means are integrally formed from a continuous piece of metal.

10. The improved probe of claim 9, wherein the second and third crop yield product interception means are first and second actuating arms, respectively, wherein at distal ends of the first and second actuating arms each of the first and second actuating arms have rounded corners, viewed from the direction of flow of crop yield product, in order to minimize an amount that the probe impedes the flow of crop yield product while maximizing a quantity of crop yield product intercepted by the probe.

11. The improved probe of claim 10, wherein the first crop yield product interception means has a first width, taken traversely to the direction of the flow of crop yield product which the probe intercepts, that is at least about two inches.

12. The improved probe of claim 11, wherein at the distal end of the probe, the probe has a second width, taken from an outer edge of the first actuating arm to an outer edge of the second actuating arm and taken traversely to the direction of the flow of crop yield product which the probe intercepts, that is at least about 3.5 inches.

13. The improved probe of claim 12, wherein the probe further comprises a notch positioned between the first and second actuating arms and adapted to allow crop yield product to flow between the first and second actuating arms.

14. The improved probe of claim 13, wherein the notch of the probe extends from the distal end of the probe toward the proximal end of the probe by a third distance, wherein the third distance is at least about 1.5 inches.

15. The improved probe of claim 14, wherein the notch has a third width, taken traversely to the direction of the flow of crop yield product which the probe intercepts, of at least about 1 inch.

* * * * *